United States Patent
Morley et al.

[11] Patent Number: 5,848,132
[45] Date of Patent: Dec. 8, 1998

[54] TELECOMMUNICATIONS NETWORK HAVING RESIDENT ABILITY TO PRE-BOOK SCHEDULED CALL BACK SERVICES

[75] Inventors: Michael Charles Morley, Ispwich; David Raymond Wild, Merstham, both of England

[73] Assignee: British Telecommunications public limited company, London, England

[21] Appl. No.: 648,612

[22] Filed: May 16, 1996

[30] Foreign Application Priority Data

Mar. 14, 1996 [EP] European Pat. Off. .............. 96301762

[51] Int. Cl.⁶ .............................. H04M 1/64; H04M 3/58
[52] U.S. Cl. ........................... 379/88; 379/209; 379/207; 379/202
[58] Field of Search ..................................... 379/207, 201, 379/214, 212, 210, 88, 89, 202, 204, 205, 209

[56] References Cited

U.S. PATENT DOCUMENTS

| | | | |
|---|---|---|---|
| 4,910,766 | 3/1990 | Ogino et al. | 379/201 |
| 5,040,208 | 8/1991 | Jolissaint | 379/209 |
| 5,155,761 | 10/1992 | Hammond | 379/67 |
| 5,408,526 | 4/1995 | McFarland et al. | 379/202 |
| 5,425,091 | 6/1995 | Josephs | 379/201 |
| 5,533,100 | 7/1996 | Bass et al. | 379/67 |
| 5,579,382 | 11/1996 | Tsukishima | 379/209 |

FOREIGN PATENT DOCUMENTS

| | | |
|---|---|---|
| 0426361 A2 | 5/1991 | European Pat. Off. . |
| 0435449 A2 | 7/1991 | European Pat. Off. . |
| 0520215 A2 | 12/1992 | European Pat. Off. . |
| 0582440 A2 | 2/1994 | European Pat. Off. . |

OTHER PUBLICATIONS

Patent Abstracts of Japan, vol. 15, No. 323 (E–1101), 16 Aug. 1991 & JP–A–03 120941 (NEC Corp), 23 May 1991.
IBM Technical Disclosure Bulletin, vol. 38, No. 5, May 1995, New York, US p. 557 XP000519679, "Self–Serve Teleconference Call Arrangement".
IBM Technical Disclosure Bulletin, vol. 37, No. 1, Jan 1994, New York, US, p. 679, XP000428926, "Method for Automatic Conference Calling by Scheduled Calendar Event".
Patent Abstracts of Japan, vol. 11, No. 20 (E–472), 20 Jan. 1987 & JP–A–61 189759 (NEC Eng Ltd), 23 Aug. 1986.
Patent Abstracts of Japan, vol. 13, No. 312 (E–788), 17 Jul. 1989 & JP–A–01 082847, (NEC Corp), 28 Mar. 1989.
Patent Abstracts of Japan, vol. 15, No. 185 (E–1066), 13 May 1991, & JP–A–03 045063 (NEC Corp), 26 Feb. 1991.
Unterstein, "Intelligent Network Services", Proceedings of the International Council for Computer Communication Intelligent Network Conference, 4–6 May 1992, Tampa, Florida, US, pp. 552–563, SP000578637.

*Primary Examiner*—Daniel S. Hunter
*Attorney, Agent, or Firm*—Nixon & Vanderhye P.C.

[57] ABSTRACT

Automated call booking, call reconnection and diary booking services are described with reference to an intelligent network. The network includes service switching points (SSP) and a service control point (SCP) includes a number of intelligent peripherals (IP) arranged to provide services to customers. On receipt of an access code from a customer line, the SSP refers the request to the SCP which directs connection of IPs to obtain instructions from the customer. In one case, the customer can pre-book an automated telephone conference call at a specified date and time (or at regularly recurring intervals). An alternative service enables a customer to request reconnection of a call currently in progress at a specified later time or after a pre-determined period. A voice record and replay facility enables useful alarm call information to be stored.

11 Claims, 10 Drawing Sheets

TELECOMMUNICATIONS NETWORK HAVING RESIDENT ABILITY TO PRE-BOOK SCHEDULED CALL BACK SERVICES

BACKGROUND OF THE INVENTION

1. Field of the Invention

The present invention relates to telecommunications networks and more particularly to services provided by such networks.

2. Related Art

The public switched telephone network (PSTN) is capable of providing customers with many services other than basic telephony. Digital networks such as that provided by BT in the United Kingdom have the ability to effect call connection very quickly. Thus dual tone multi frequency (DTMF) signalling from customers before, during or on termination of telephone calls can be used to connect special services.

Further, special service platforms may be called by customers requesting connection to specified network numbers to provide additional services. One such service which has been automated is an "alarm" or "wake-up" call facility. The customer may dial up the alarm call service and using DTMF specify a time (using e.g. the twenty four hour clock) at which he wishes to be woken. At the specified time the network causes the customers telephone to be called by setting up an automatic call through the PSTN. Such a service is quite simple to operate but is very unsophisticated leaving the customer to decide exactly what further action is to be taken in response to the call.

SUMMARY OF THE INVENTION

According to the present invention there is provided a telecommunications network including means responsive to signals transmitted from a first customer line during a first call connection to store time data defining a time specified by such signals and to store connection data defining a call connection characterised in that the network includes control means responsive to the time data to establish a further call to the first customer line at the time specified and to connect the first customer line through the network to at least one other network node determined from the connection data.

A first feature of the invention allows a customer to effect signalling while the first call is in progress in which case the connection data defines the current call connection whereby the call is re-established at the time specified by the time data.

Alternatively, the connection data may be derived from further signals transmitted from the first customer line. In either case, the connection data may define more than one network node such that the subsequently established communication is between three or more network nodes.

A further feature of the invention allows the customer to record a message which is replayed to the first customer line when the later call is established. The time data stored may define more than one time or may store a repeat period whereby more than one subsequent call is established and/or regular calls are automatically established under control of the network control means without further customer intervention.

BRIEF DESCRIPTION OF THE DRAWINGS

A telecommunications network in accordance with the invention will now be described by way of example only with reference to the accompanying drawings of which.

DETAILED DESCRIPTION OF EXEMPLARY EMBODIMENTS

Figure 1:
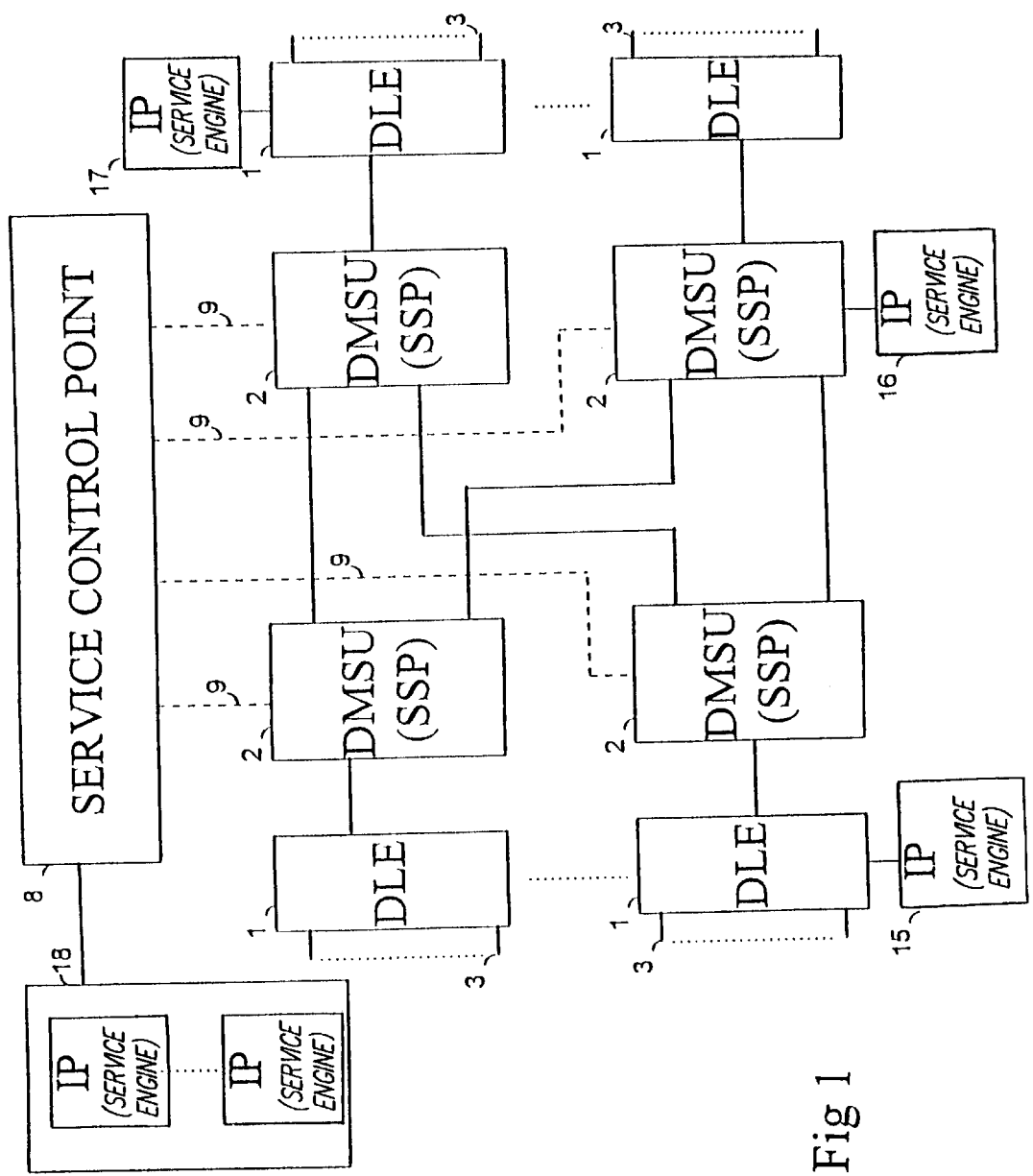
FIG. 1 is a block schematic diagram of the telecommunications network.

Referring now to FIG. 1 digital telecommunications networks, that is to say those which operate using time division multiplex channels normally comprise a number digital local exchanges 1 each of which is parented on at least one of a number of fully interconnected digital main switching units 2. Each local exchange 1 provides service to a number of customer lines 3 any one of which may be switched through the network to any other line on any of the exchanges and to lines connected to other systems (not shown). The main PSTN in the United Kingdom is of this form.

The exchange switches 1 and 2 each have a processor control system associated therewith to provide intelligent handling of switching. Thus the processor unit associated with one of the switches 1 will receive transmitted digits from a customer line 3 which digits will indicate either a call to another line 3 on the same exchange 1 or requirement for connection to another point in the network. Where connection to another point in the network is required signalling channels are used to pass information to one of the DMSUs and thence to a destination exchange possibly through a further DMSU 2. Positive interconnection between a line 3 on a first exchange 1 to line 3 on the destination exchange only occurs if the destination line 3 is available.

The rapid switching capability of a digital network means that a connection does not need to be completed until all of the digits defining a destination have been received. Traditionally digital networks use service platforms (not shown) to provide special services to the network customers such as (e.g.) freephone 0800, local charging, premium rate services and the like. Specific service platforms will be located within the network at say one of the DMSUs 2 and, if a customer dials a network access code for one of the special services the call is connected to the appropriate service platform through the network, the service platform analysing subsequent digits and connecting via a special switch back through the network to the required destination.

Figure 2:
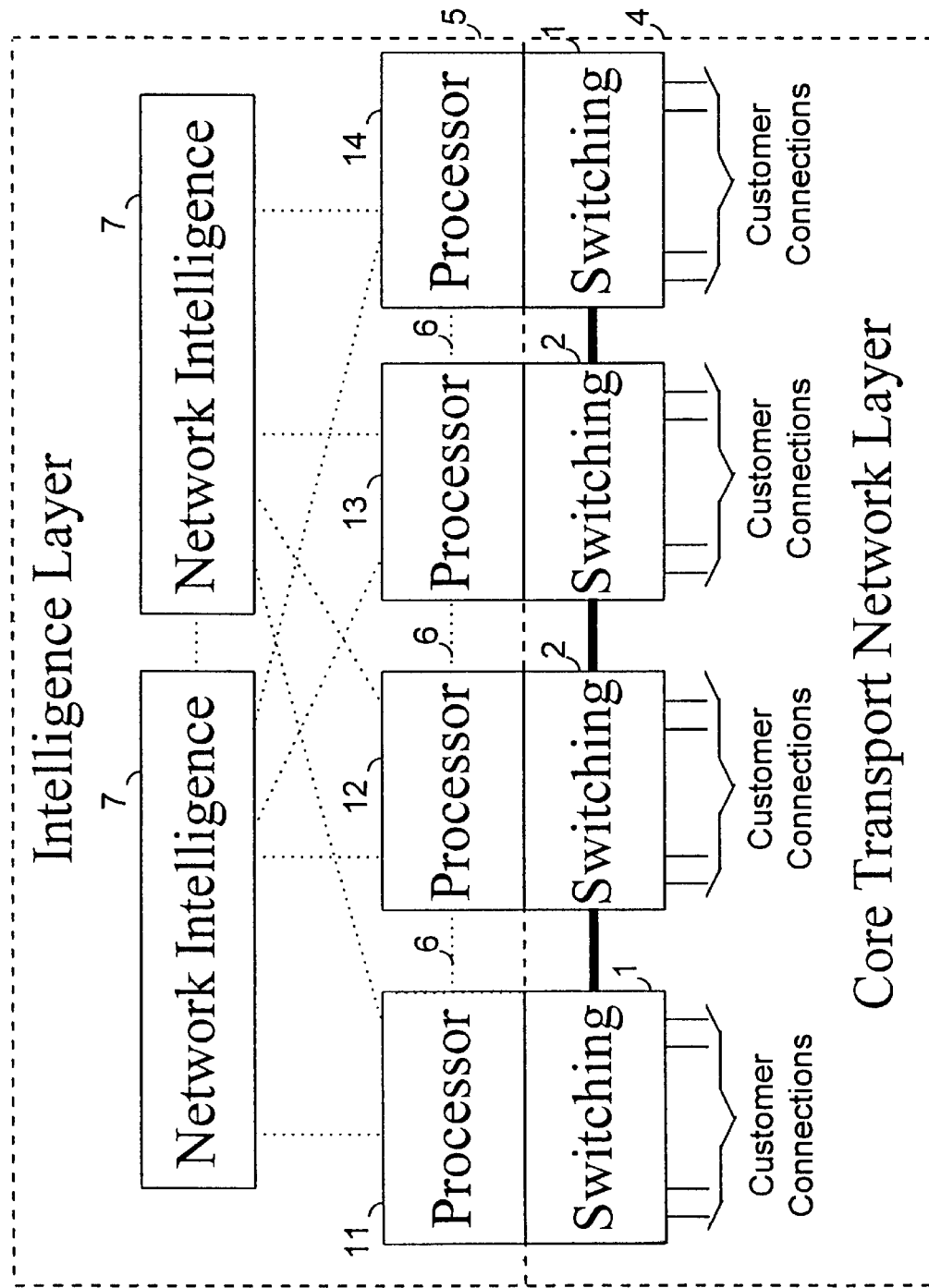
FIG. 2 is a schematic diagram showing an interpretation of the network elements of FIG. 1.

Providing such special platforms and additional switching capability can delay the introduction of new services. However referring additionally to FIG. 2, it is possible to consider a telephone network as comprising a number of layers. A first layer, the core transport network layer 4, comprises the switching capability and trunking of the exchange network 1 and 2 with the trunking in-between while the processors 11, 12, 13 and 14 of the exchanges 1 and 2 represent an intelligence layer 5. A virtual path exists shown by dotted lines 6 between the computer facilities of the network. As C7 signalling is used to transfer information it is possible to add another level of intelligence here represented as network intelligence 7 having communications access with the processors of the switching units. Now, if a processor reaches a point at which it requires additional processing power it may refer to the higher intelligence layer 7 for instructions. Thus all that the processors of a switching unit 1, 2 need to do is to recognise a requirement for additional service functionality. The processors may be programmed to recognise customer action or customer signalling representing a trigger to additional service functionality. Once triggered the processor refers relevant data such as the identity of the calling line, the digits dialled, special class of service to the network intelligence layer 7 which may instruct the processor to perform specific tasks within its capability for handling a particular call.

Thus referring back to FIG. 1 the intelligent network comprises service switching points which may be the digital local exchanges 1 or digital main switching units 2 and a service control point 8 (of which there may be several) to which the exchange processors refer via virtual signalling paths (shown dotted) 9. Specialised service engines or intelligent peripherals 15, 16 and 17 (which are integral with specific service switching points but nevertheless accessible through the network to any connection) may provide dedicated functions and calling lines 3 may be switched to these peripherals through the network as a result of instructions from the service control point 8. Thus, for example an intelligent peripheral may be equipped to provide voice prompts, message storage functionality or specific data storage or programming function. Stand-alone intelligent peripherals 18 may be provided at a Service Control Point or elsewhere in the network. The intelligent peripheral 18 is accessible through the network (connections not shown) and may have direct connections to several or all DMSUs and/or DLEs of the network.

The present invention is described with reference to an intelligent network although it will be appreciated that the kind of service here noted could be provided using dedicated service platforms.

Figure 3:
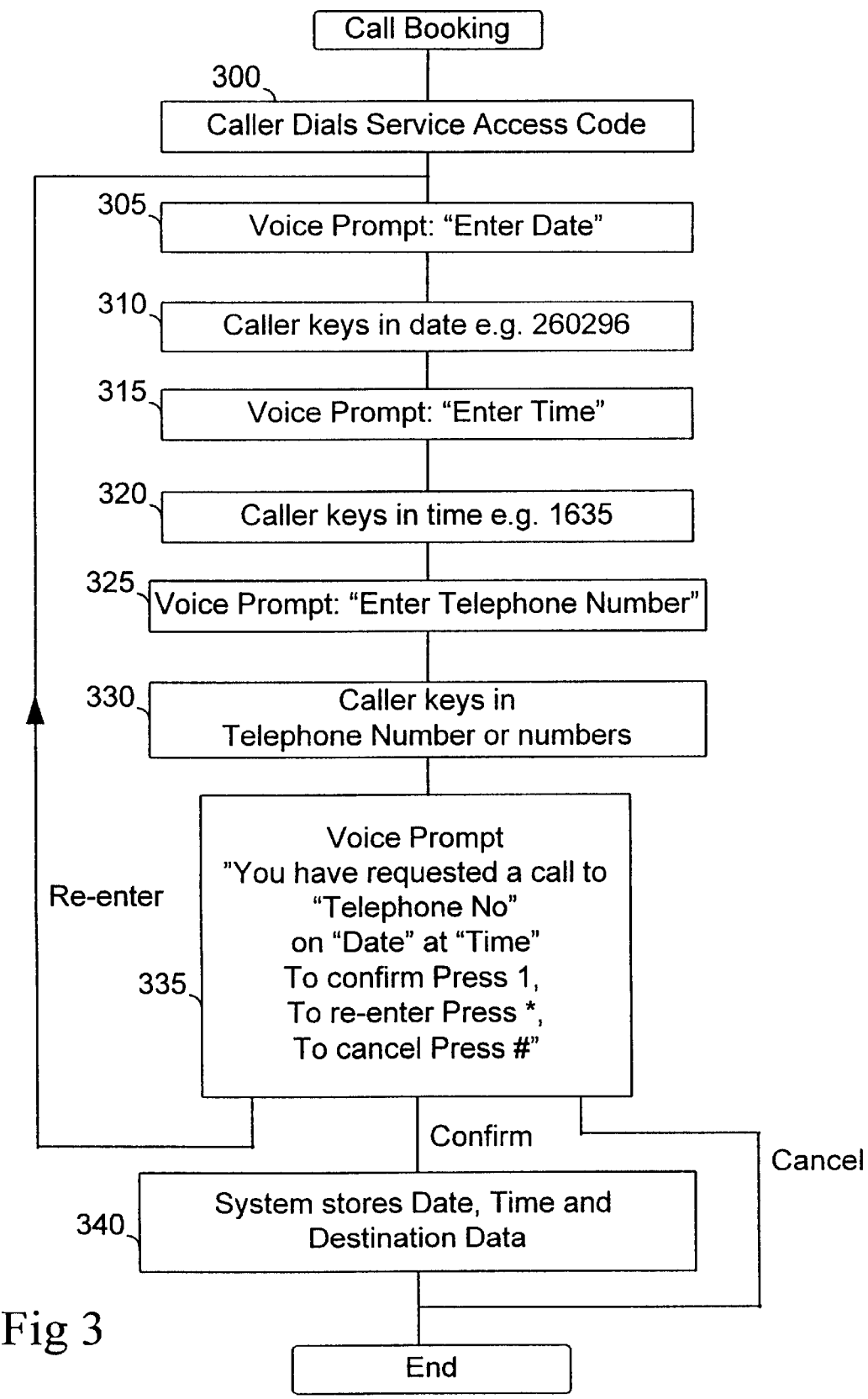
FIG. 3 is a service flow diagram in respect of an automatic call booking service.

Referring now to FIGS. 1 and 3, if a customer wishes to book a call at a specific date and time, possibly a conference call involving several connections, the service switching point 2 will receive by way of the customer's line 3 appropriate dialled digits. This will result in a trigger at the service switching point (SSP) 2 which will refer the dialled code and customers calling line identity to the service control point 8 by way of the C7 signalling channel 9. Other relevant data relating to the status of the calling line, and/or the current call may be simultaneously transferred and may be used in determining how the service request is subsequently handled. Assuming that the service is available to the calling customer, the service control point will cause the SSP to switch the call to an appropriate IP for service which provides the complete booking functionality. Thus at step 305 the IP, say 15, will provide a voice prompt to the customer to encourage the customer to enter an appropriate date upon which the call is required. Although for simplicity a simple instruction enter date is shown, it will be appreciated that a series of options may be given to the customer such as booking a call for today, tomorrow or at a future date. Assuming that the caller enters an appropriate date as shown at step 310 the IP provides an opportunity for the customer to enter a time, probably suggesting use of the 24 hour clock to enter the information as shown at step 315.

At step 320 the customer enters appropriate digits, those shown here indicating a requirement for a call to be established at four - thirty five PM. The caller will now be prompted at step 325 to enter a telephone number or, for conference calls to enter a series of telephone number each separated by for example a hash (#). Once the numbers have been keyed in as indicated at step 330 the intelligent peripheral 15 provides an indication of the booked call and gives the customer an opportunity to provide confirmation.

Assuming that confirmation is received then the call will be cleared by the service switching point 2 and the data recovered is transferred at step 340 to the service control point 8. Although data concerning the booking is noted here as being transferred en bloc, with a single instruction from the SCP 8 to the SSP to effect connection of an IP, it will be appreciated that each stage of the acceptance of signalling from the customer could result in that data being transferred on receipt. Each section of data recovery, voice prompting and the like could be handled by separate intelligent peripherals with the SCP instructing the SSP to connect a peripheral on transfer of received data relating to the preceding stage of the booking set up.

Figure 4:
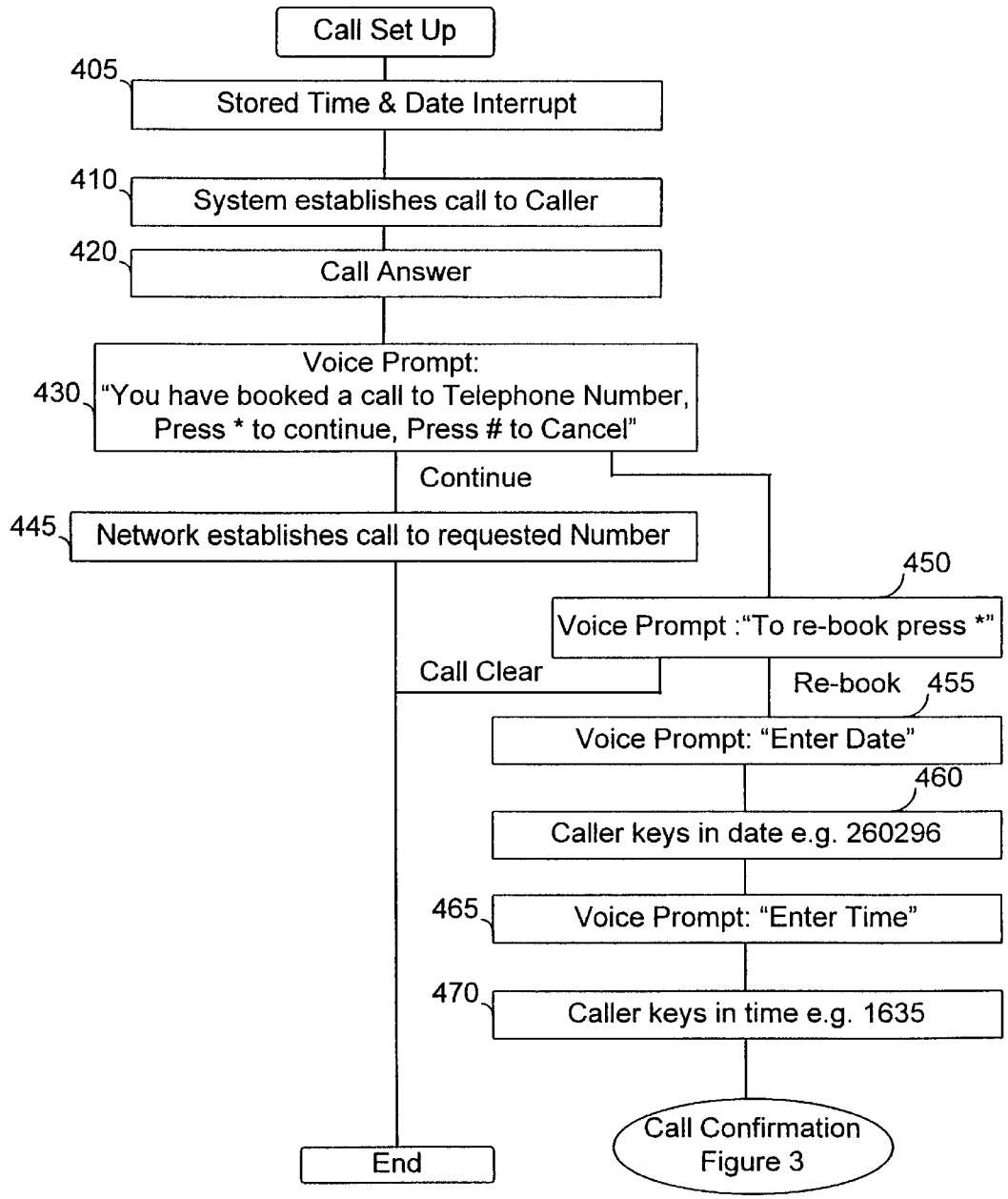
FIG. 4 is a service flow diagram in respect of call set up following call booking.
Figure 5:
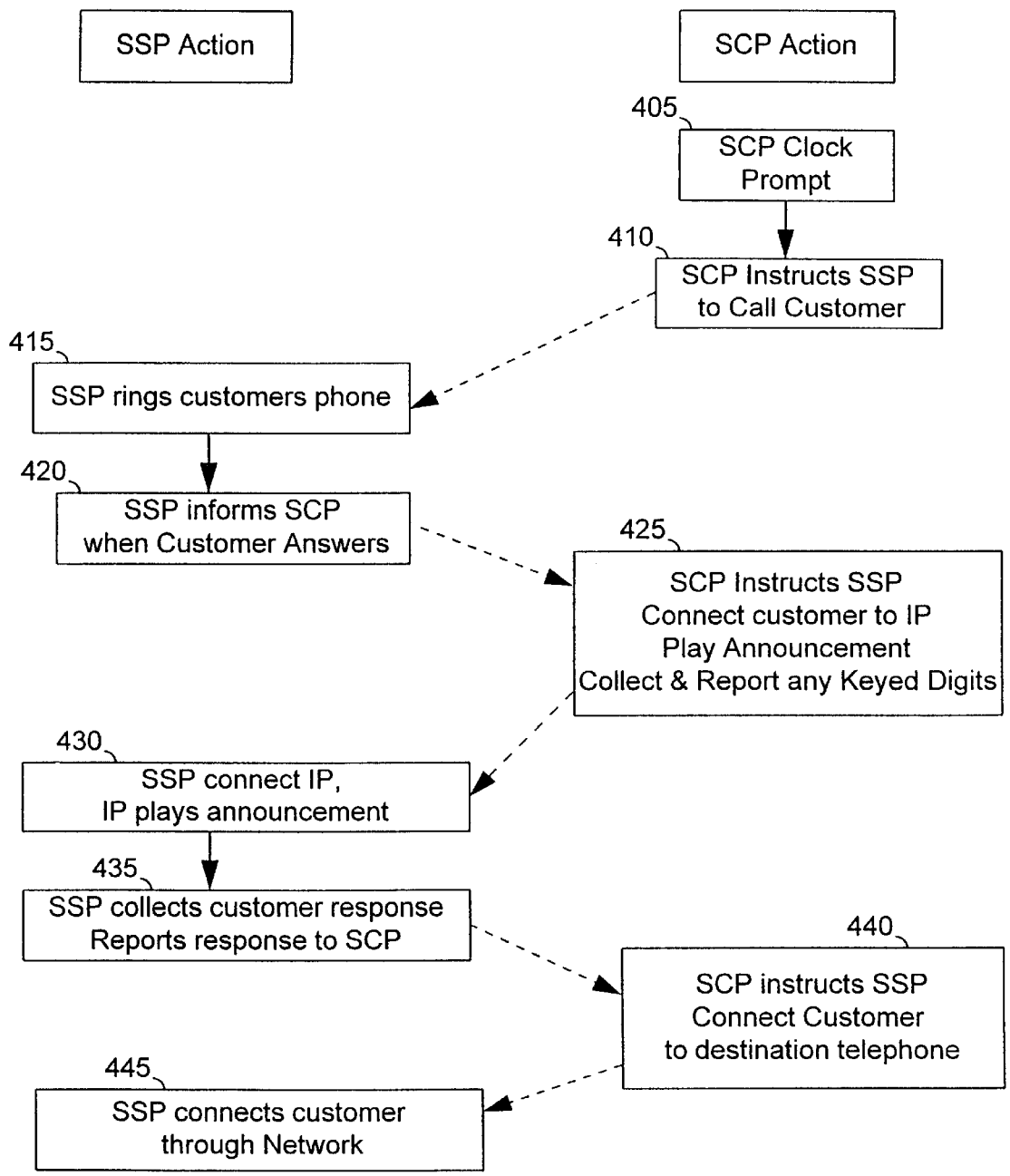
FIG. 5 is a schematic diagram showing the inter-action of a service control point and a service switching point of the network of FIG. 1 during the establishment of the later call in the automatic call booking service.

Referring now to FIG. 4 once the clock at the service control point 8 reaches the supplied time and date a service engine is triggered which referring also to FIG. 5 causes the SCP to instruct the SSP to effect a call to the originating customer. This is indicated at step 410, the SSP in will establish a call to the customer line 3 and apply ringing to the customer line as indicated at step 415. Now when the customer answers the call as indicated at step 420 the SCP 8 is again notified by the exchange trigger mechanism and causes the SSP 2 to effect connection between the customer line 3 and an appropriate intelligent peripheral, say 16, to cause an announcement to be played to the customer at step 430.

Assuming that the customer provides a confirmation of the request, here indicated as depressing the "star" button at step 435 the response is reported to the SSP which then passes the destination connection data to the SSP 2 so that network connection to the destination telephone number or numbers is effected at step 445.

If, at step 430, the customer declines to proceed with the booked call (i.e. by pressing the hash button) then as indicated at step 450 to steps 470 the customer may be given opportunity re-book the call for a later time using similar prompts to that previously described for FIG. 3 using connection again to the intelligent peripheral 15.

Figure 10:
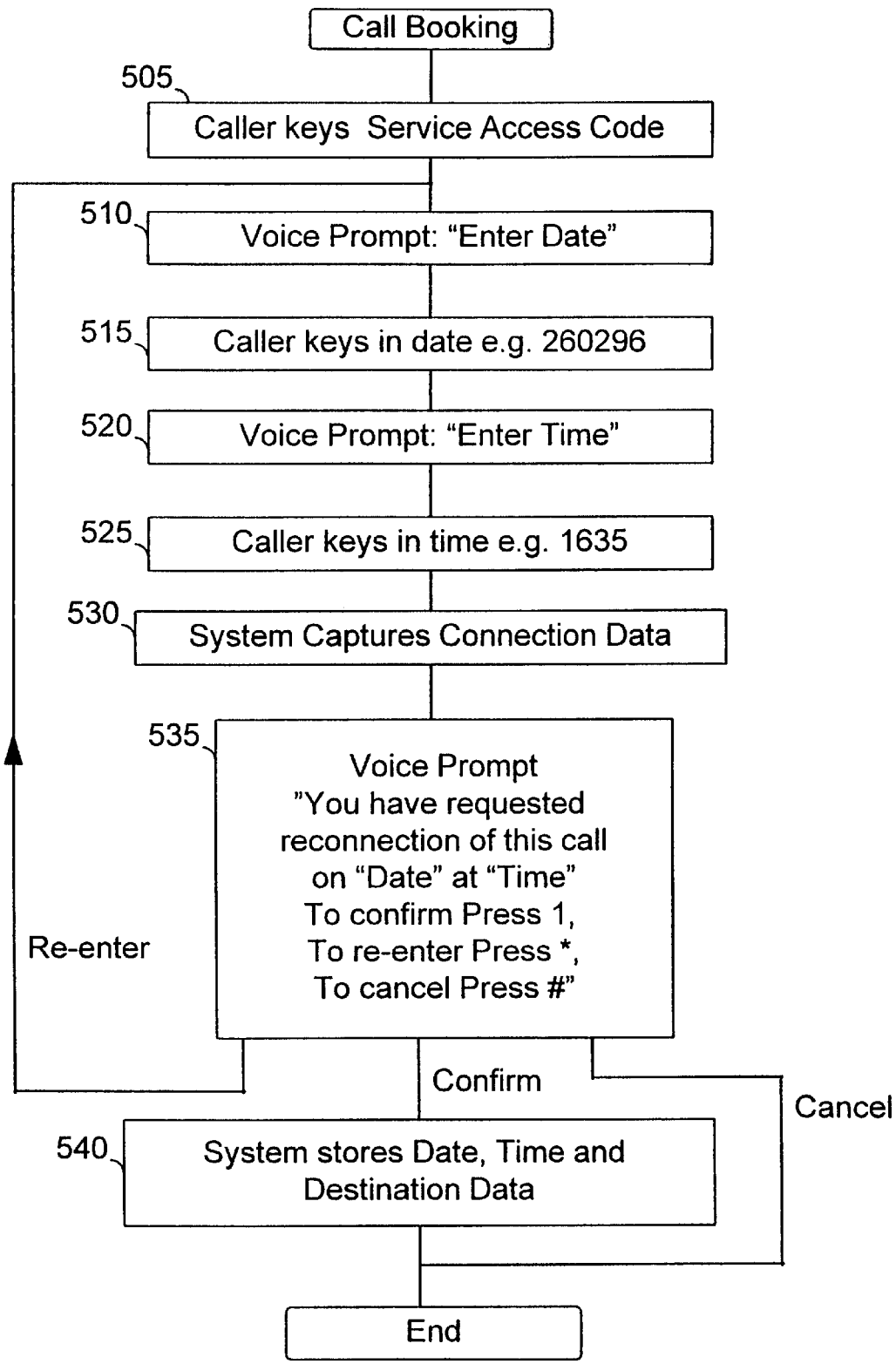
FIG. 10 shows a service flow diagram in respect of a call booking service for effecting reconnection of a current call at a subsequent time.

In an alternative or additional manner of providing a similar service, referring now to FIG. 10, if during a course of an established call a customer signals the call booking service access code or a specifically allocated code then the customer may be prompted as indicated at steps 510 to 525 to key in a date and time at which time the call in progress should be reconnected. This may be particularly appropriate if a customer has been entered in a queue by a tele-sales operative for example or if the parties to the call agree to communicate at a later time. The process is again similar to that described with reference to steps 305 to 320 of FIG. 3. However in the present case at step 530 the system captures the current connection data from the service switching point. Again at step 535 as previously described with reference to advanced call booking the intelligent peripheral involved may provide a confirmation request at step 535 and the SCP 8 stores the date, time and destination data at step 540. Re-establishment of the call is identical to the method of establishing a call as described with reference to FIGS. 4 and 5.

Alternatively, a simpler re-connection facility may be provided with the customer signalling a service access code and a single digit indicating a request for reconnection in say ten minutes, thirty minutes, one hour etc. Again, such a service could be voice prompted to offer the customer the quicker reconnection option avoiding the need for date and time entry.

In an additional facility which may be included where network based call queuing is in use (see for example our co-pending European Patent application number EP95307386.3), on customer request the calling line may be scheduled into the queue for re-connection at a specified time so that when meeting queuing conditions the customer wait for answer may be more usefully employed.

In a further development of use of the systems clock interrupt capability to provide number time and date data in combination with network message storage capability for example such as that described in our co-pending European Patent application number (Our Reference A24995) filed 4th Mar. 1995 a sophisticated reminder call facility may be provided.

Figure 6:
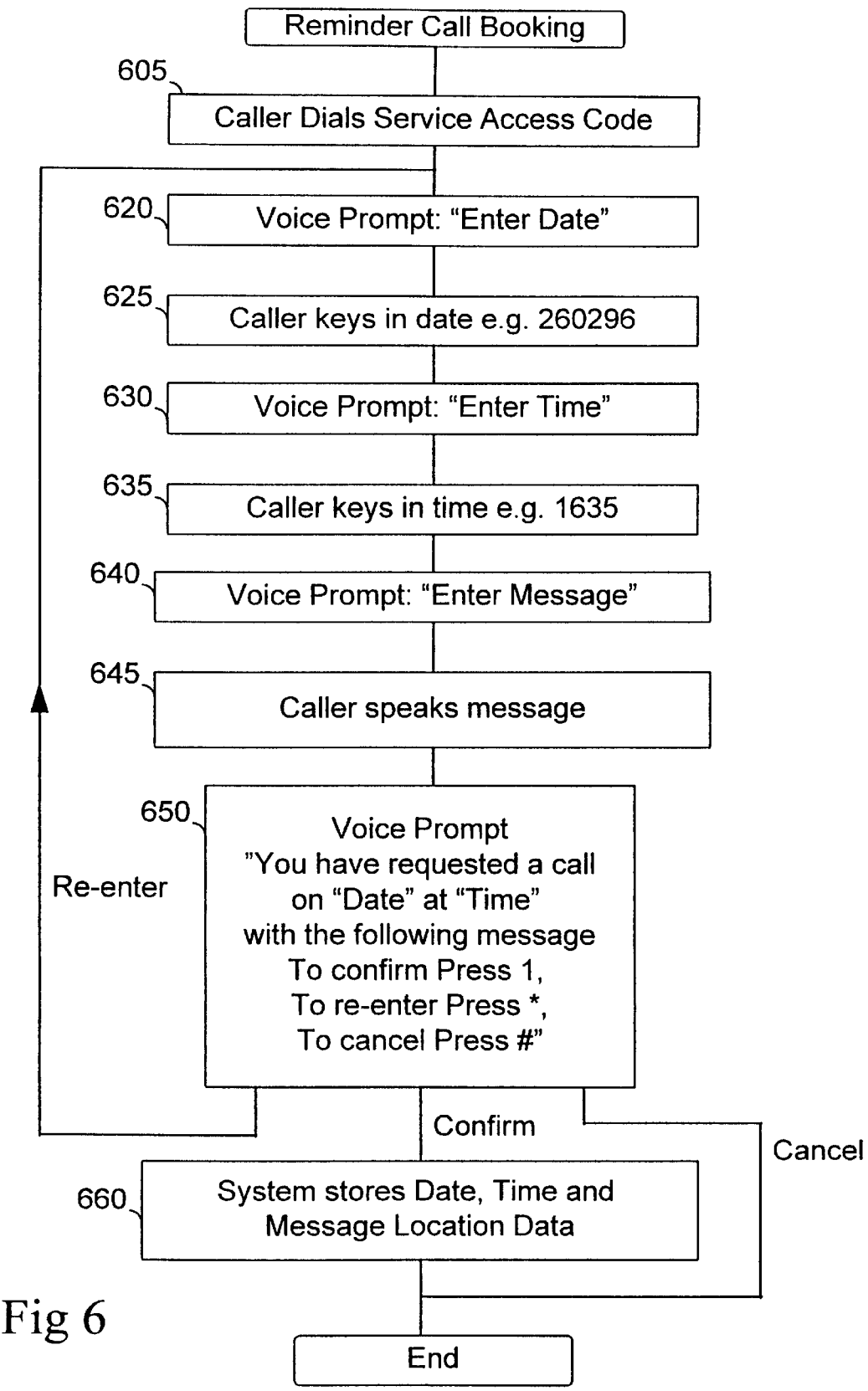
FIG. 6 shows a modification to the service flow diagram of FIG. 2 in respect of a diary call booking service.
Figure 8:
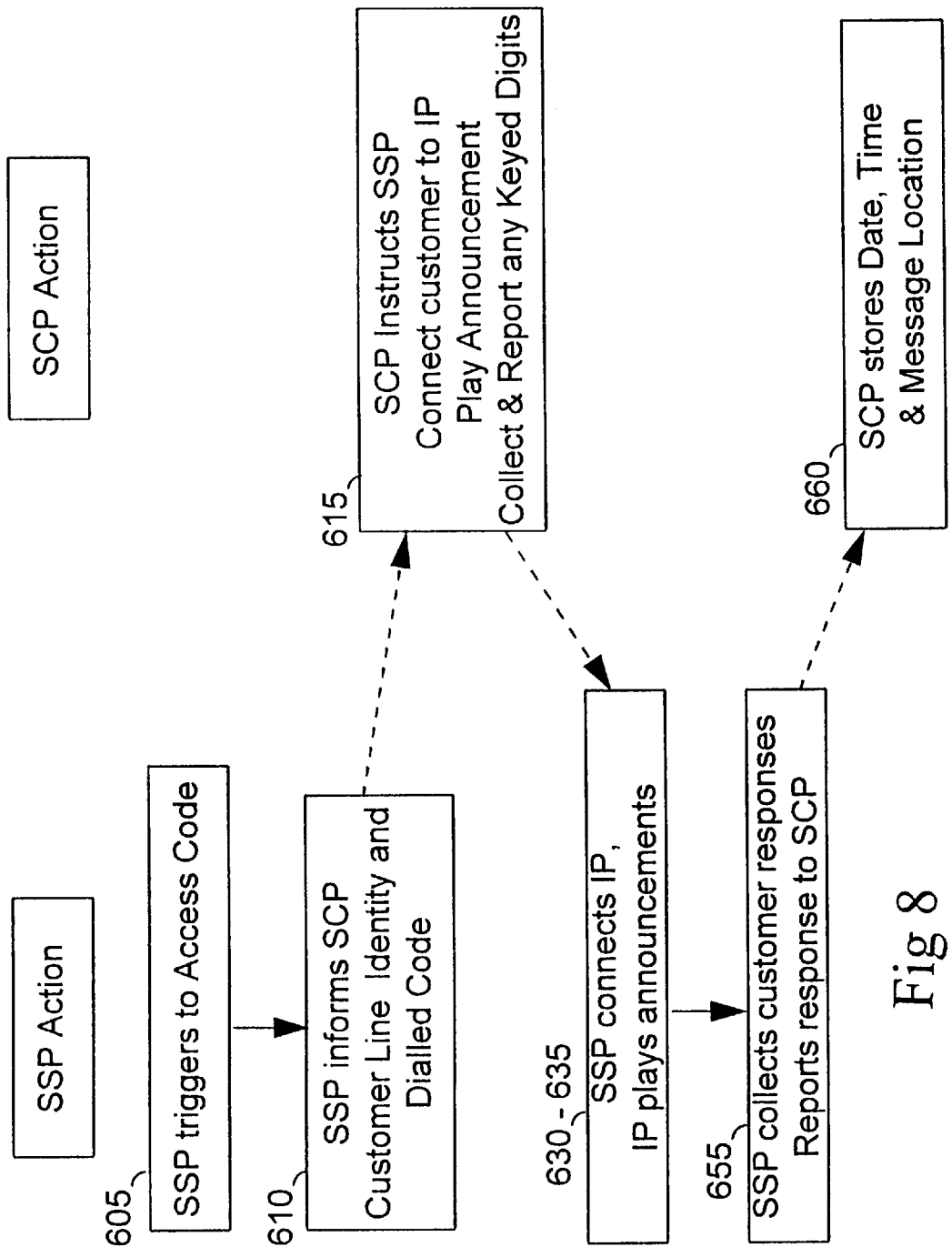
FIG. 8 is a schematic diagram showing the inter-action of a service control point and a service switching point of the network of FIG. 1 during the establishment of the first call in the diary call booking service.

Thus referring to FIGS. 6 and 8 if a customer dials the service access code as indicated at step 605 then the SSP transmits the customer line identity and stored code to the SCP 8. The SCP will effectively instruct the SSP to cause connection of the customer to one of the intelligent peripherals which in a similar manner to that described to in reference to call booking prompts at steps 630 to 635 for date and time of reminder.

The caller may now be connected to an appropriate message storage facility as indicated at steps 640 and be prompted to record the reminder message. Again these are checked at step 650 and at step 655 passed back to the service control point 8 which at step 660 will store the date, time and the message location data. The message location data is determined from the message platform on which the customer reminder message has been stored. Such storage is not permanently allocated to one particular customer but is only allocated on an as required basis.

Figure 7:
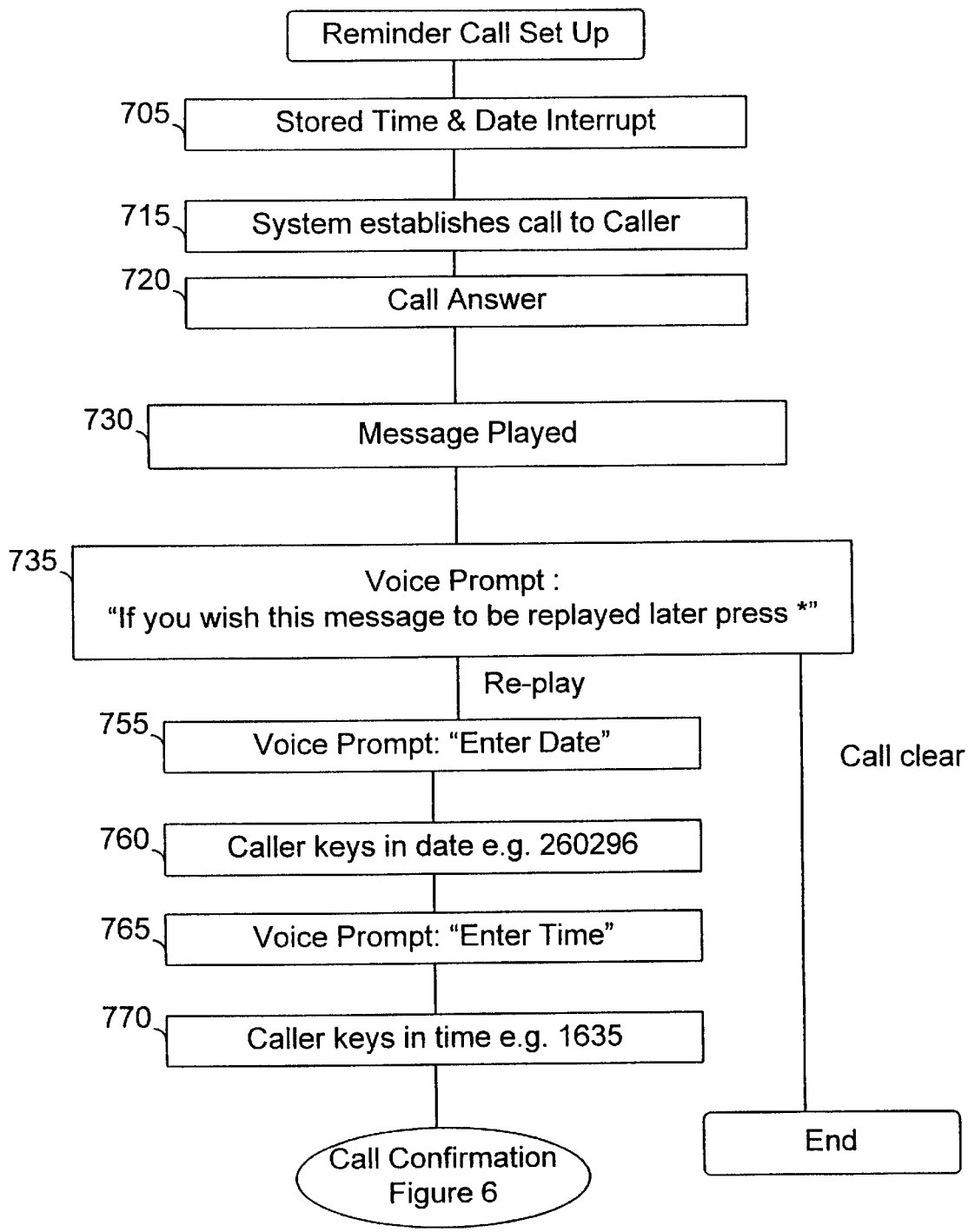
FIG. 7 shows a service flow diagram in respect of the call set up following the diary call booking service.
Figure 9:
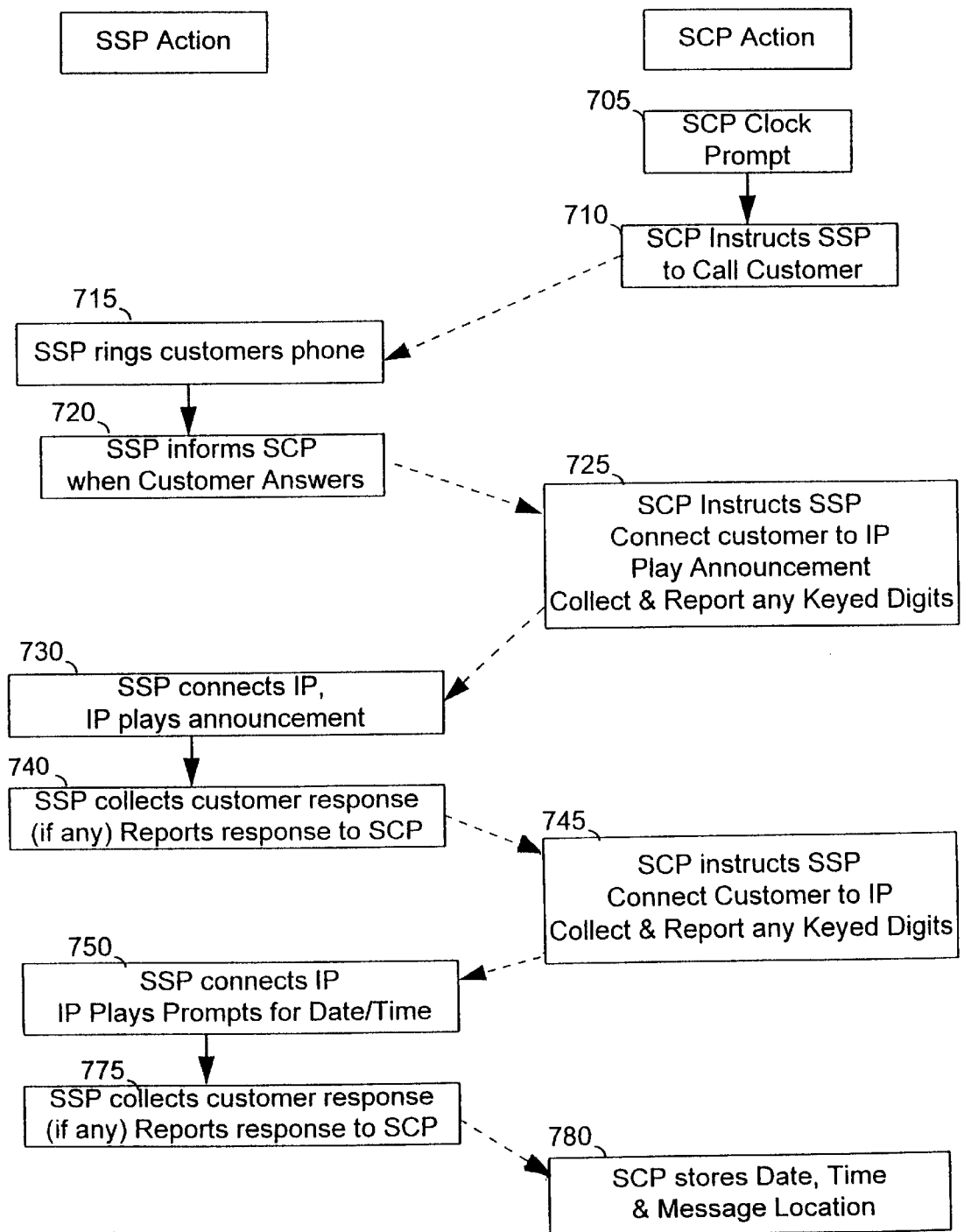
FIG. 9 is a schematic diagram showing the inter-action of a service control point and a service switching point of the network of FIG. 1 during the establishment of a later call in the diary call booking service.

Now as indicated in FIGS. 7 and 9 when the system control in the service point 8 reaches the appropriate date and time the SCP instructs the service switching point 2 to call the customer as indicated at steps 710 and the system establishes the call to the caller (step 715) and awaits call answer at step 720. Once the call is answered then the SSP again contacts the service control point 8 which instructs the connection of the appropriate IP or message storage facility at which the customers current message is held. As at step 730 the customer is connected to an appropriate intelligent peripherals (say 17) and the message is played back. A voice prompt inviting the customer to have the message replayed at a later time is then given at step 735 and if the customer indicates that a later message replay is required. After step 735 the customer response is referred to the service control point 8 at step 740. The SCP 8 at step 745 causes the service switching point at step 750 to connect an appropriate IP (say 15) to enable the date and time information to be collected at steps 755 to step 770 in a similar manner to that previously noted. Confirmation of the arrangement may be given by returning to step 650 of FIG. 6. Once the customer response has been collected then at 775 the service control point is notified and at 780 will update the stored date and time associated with the message location.

It will be appreciated that while the system has been described with reference throughout to booking for specific events on a one-of basis the opportunity to store information resulting in a reminder repeated at periodic intervals such as day, month or longer periods is possible. Thus if a customer requires to collect information from a destination point or needs to check on the well being of another customer at regular intervals then the pre-booking facility can be so used.

We claim:

1. A telecommunications network comprising:

(a) a plurality of switches connected to provide switched telecommunications services between any two or more nodes of the network, some of said nodes comprising telephone lines to customer premises;

(b) switch control means associated with each of said switches and responsive to signaling from a first of said telephone lines to effect set up of a communication path to at least one other of said telephone lines; and (c) network control means responsive to further signaling from one of the communicating telephone lines during an established call to capture and store line identity data identifying each of said first and said at least one other of said telephone lines, said network control means further including c(i) means to provide voice prompts to said one of the communicating telephone lines;

c(ii) means to derive from signaling from said communicating telephone line time data defining a call-back time and to associate said time data with said line identity data;

c(iii) means responsive to network clock data at said defined call-back time to cause set up of a communications path to the one of said telephone lines which requested re-establishment and to cause a calling signal to be applied thereto; and c(iv) means responsive to an answer signal from said one of said telephone lines to re-establish said communications path between said first and said at least one other of said telephone lines.

2. A telecommunications network as in claim 1 in which said network control means further includes means to derive said call-back time from network clock data plus a predetermined time period derived from signaling from a communicating telephone line.

3. A telecommunications network as in claim 1 in which the network control means includes means responsive to said answer signal to transmit signals to said one communicating telephone line prior to re-establishing said communications path and to respond to further signaling from said one communicating telephone line to abort the re-establishment of the call.

4. A telecommunications network as in claim 3 including means responsive to said further signaling indicating that the re-establishment is to be aborted to store amended time data indicating a revised call-back time.

5. A telecommunications network as in claim 1 further including means to connect one of said telephone lines to storage means which prompts a user of said telephone line to record a message for subsequent re-transmission and to associate said message with said time data such that on re-establishment of said communications path the recorded message is re-transmitted to said one communicating telephone line.

6. A telecommunications network as in claim 2 in which the network control means includes means responsive to said answer signal to transmit signals to said one communicating telephone line prior to re-establishing said communications path and to respond to further signaling from said one communicating telephone line to abort the re-establishment of the call.

7. A telecommunications network as in claim 6 including means responsive to said further signaling indicating that the re-establishment is to be aborted to store amended time data indicating a revised call-back time.

8. A telecommunications network comprising:

a plurality of switches connected to provide switched telecommunications services between plural telephone lines to customer premise equipment in response to connection request signaling emanating from one of said telephone lines; and a network control circuit responsive to further signaling from at least one connected and communicating telephone line during a successfully established telephone call to schedule a future call-back service to at least one of the then connected and communicating telephone lines.

9. A telecommunications network as in claim 8 wherein said network control circuit responds to said further signaling to re-establish the same communicating telephone line connections at a future scheduled time.

10. A method for controlling a telecommunications network, said method comprising:

providing switched telecommunications services between plural telephone lines to customer premise equipment in response to connection request signaling emanating from one of said telephone lines; and in response to further signaling from at least one connected and communicating telephone line during a successfully established telephone call, scheduling a future call-back service to at least one of the then connected and communicating telephone lines.

11. A method as in claim 10 wherein said further signaling re-establishes the same communicating telephone line connections at a future scheduled time.

* * * * *